(12) United States Patent
Fukuoka et al.

(10) Patent No.: US 10,112,844 B2
(45) Date of Patent: Oct. 30, 2018

(54) CALCIUM CARBONATE MICROPARTICLES AND PROCESSES FOR PREPARING THEM

(71) Applicant: NIPPON PAPER INDUSTRIES CO., LTD., Tokyo (JP)

(72) Inventors: Moe Fukuoka, Tokyo (JP); Toru Nakatani, Tokyo (JP); Shisei Goto, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 0 days.

(21) Appl. No.: 15/300,465

(22) PCT Filed: Mar. 31, 2015

(86) PCT No.: PCT/JP2015/060200
§ 371 (c)(1),
(2) Date: Sep. 29, 2016

(87) PCT Pub. No.: WO2015/152269
PCT Pub. Date: Oct. 8, 2015

(65) Prior Publication Data
US 2017/0113945 A1    Apr. 27, 2017

(30) Foreign Application Priority Data

Mar. 31, 2014  (JP) .................................. 2014-071680
Mar. 31, 2014  (JP) .................................. 2014-073570
Mar. 31, 2014  (JP) .................................. 2014-073629

(51) Int. Cl.
*C01F 11/18*    (2006.01)
*C09C 1/02*    (2006.01)
(Continued)

(52) U.S. Cl.
CPC ........... *C01F 11/181* (2013.01); *B01J 19/008* (2013.01); *C08K 3/26* (2013.01); *C08L 23/12* (2013.01);
(Continued)

(58) Field of Classification Search
CPC .................................................... C01F 11/181
See application file for complete search history.

(56) References Cited

U.S. PATENT DOCUMENTS 3,443,890 A    5/1969  Sisson et al.
5,075,093 A   12/1991  Tanaka et al.
(Continued)

FOREIGN PATENT DOCUMENTS

CA          2944320 A1    10/2015
DE    102006026965 A1    12/2007
(Continued)

OTHER PUBLICATIONS

Machine translated English language equivalent of JP 2011-073891 (Apr. 2011, 10 pages).*
(Continued)

*Primary Examiner* — Brieann R Johnston
(74) *Attorney, Agent, or Firm* — McCarter & English, LLP; Steven G. Davis; Wei Song

(57) ABSTRACT

The present invention aims to provide techniques for efficiently preparing calcium carbonate particles having an average primary particle size of less than 1 μm. Calcium carbonate microparticles having an average primary particle size of less than 1 μm can be synthesized efficiently by synthesizing calcium carbonate in the presence of cavitation bubbles.

13 Claims, 10 Drawing Sheets

(51) Int. Cl.
*D21H 17/67* (2006.01)
*D21H 19/38* (2006.01)
*C08K 3/26* (2006.01)
*C08L 23/12* (2006.01)
*B01J 19/00* (2006.01)

(52) U.S. Cl.
CPC ............ *C09C 1/021* (2013.01); *D21H 17/675* (2013.01); *D21H 19/385* (2013.01); *C01P 2004/03* (2013.01); *C01P 2004/61* (2013.01); *C01P 2004/62* (2013.01); *C01P 2004/64* (2013.01); *C01P 2006/12* (2013.01); *C01P 2006/19* (2013.01); *C08K 2003/265* (2013.01); *C08L 2205/16* (2013.01)

(56) References Cited

U.S. PATENT DOCUMENTS

| | | | |
|---|---|---|---|
| 5,665,205 A | 9/1997 | Srivatsa et al. | |
| 5,679,220 A | 10/1997 | Matthew et al. | |
| 5,731,080 A | 3/1998 | Cousin et al. | |
| 5,811,070 A * | 9/1998 | You | C01F 11/182 423/265 |
| 5,824,364 A | 10/1998 | Cousin et al. | |
| 6,235,150 B1 | 5/2001 | Middleton et al. | |
| 6,540,878 B1 * | 4/2003 | Leino | C09C 1/022 106/464 |
| 8,329,289 B2 | 12/2012 | Buri et al. | |
| 8,349,939 B2 | 1/2013 | Buri et al. | |
| 8,926,793 B2 | 1/2015 | Goto et al. | |
| 9,051,689 B2 | 6/2015 | Solismaa | |
| 9,562,328 B2 | 2/2017 | Axrup et al. | |
| 2004/0108081 A1 | 6/2004 | Hughes | |
| 2004/0108082 A1 | 6/2004 | Hughes | |
| 2006/0292056 A1 * | 12/2006 | Lin | B01F 5/102 423/430 |
| 2007/0029185 A1 * | 2/2007 | Tung | A61K 9/14 204/157.41 |
| 2007/0169905 A1 | 7/2007 | Yamashita et al. | |
| 2009/0022912 A1 | 1/2009 | Kaessberger et al. | |
| 2009/0162638 A1 | 6/2009 | Buri et al. | |
| 2010/0331457 A1 | 12/2010 | Buri et al. | |
| 2011/0000633 A1 | 1/2011 | Kukkamaki et al. | |
| 2011/0226428 A1 | 9/2011 | Goto et al. | |
| 2012/0252933 A1 | 10/2012 | Gene et al. | |
| 2013/0126116 A1 | 5/2013 | Solismaa | |
| 2013/0312925 A1 | 11/2013 | Saastamoinen et al. | |
| 2015/0299959 A1 | 10/2015 | Axrup et al. | |
| 2015/0315748 A1 | 11/2015 | Imppola et al. | |
| 2017/0107668 A1 | 4/2017 | Fukuoka et al. | |
| 2017/0204270 A1 | 7/2017 | Mathur | |
| 2017/0283619 A1 | 10/2017 | Pohl et al. | |
| 2017/0306057 A1 | 10/2017 | Windebank et al. | |
| 2017/0306562 A1 | 10/2017 | Phipps et al. | |

FOREIGN PATENT DOCUMENTS

| | | | |
|---|---|---|---|
| EP | 3127868 A1 | | 2/2017 |
| GB | 2309692 A | | 8/1997 |
| GB | 2312670 A | | 11/1997 |
| IN | 201103546 I3 | * | 8/2013 |
| JP | 1072215 A | | 3/1998 |
| JP | 2003246617 A | | 9/2003 |
| JP | 2007-528946 A | | 10/2007 |
| JP | 2007-528947 A | | 10/2007 |
| JP | 2009-155120 A | | 7/2009 |
| JP | 2011-73891 A | | 4/2011 |
| JP | 2011073891 A | * | 4/2011 |
| JP | 2011073892 A | | 4/2011 |
| JP | 2011-116601 A | | 6/2011 |
| JP | 2013536329 A | | 9/2013 |
| JP | 2017-057515 A | | 3/2017 |
| JP | 2017-066578 A | | 4/2017 |
| WO | 1997/32934 A1 | | 9/1997 |
| WO | 2005/005725 A1 | | 1/2005 |
| WO | 2005/005726 A1 | | 1/2005 |
| WO | 2009/074491 A1 | | 6/2009 |
| WO | 2011110744 A2 | | 9/2011 |
| WO | 2015/152269 A1 | | 10/2015 |
| WO | 2015/152283 A1 | | 10/2015 |

OTHER PUBLICATIONS

Afin J-W et al., Synthesis of Ultrafine Calcium Carbonate Powders by Nozzle Spouting Method, Journal of the Korean Ceramic Society, Nov. 13, 1996, vol. 33, No. 11, pp. 1276-1284.
Gang Wang et al., Journal of Materials Science Letters, Jul. 1, 2002, vol. 21, No. 13, pp. 985-986.
Gareth J. Price et al., Composition of Calcium Carbonate Polymorphs precipitated Using Ultrasound, Crystal Growth & Design, 2011, vol. 11, No. 1, pp. 39-44.
Kenichi Harashima et al., Journal of the Japan Society for Abrasive Technology, Jun. 2011, vol. 55, No. 6, pp. 342-345.
Yanmin Wang, et al., Chemical Engineering Comm., Jul. 1, 2005, vol. 192, No. 10-12, pp. 1468-1481.
ISR of PCT/JP2015/060234, dated Jun. 23, 2015.
ISR of PCT/JP2015/060200, dated Jun. 23, 2015.
European Search Report for Application No. 15774197.6, dated Oct. 26, 2017. 6 pages.
Supplementary European Search Report for Application No. 15773957.4, dated Nov. 7, 2017. 6 pages.
Ciobanu et al., In-situ Cellulose Fibres Loading with Calcium Carbonate Precipitated by Different Methods. Cellulose Chem Technol. 2010;44(9):379-387.
Fortuna et al., Obtaining and Utilizing Cellulose Fibers with in-Situ Loading as an Additive for Printing Paper. Materials (Basel). Oct. 15, 2013;6(10):4532-4544.
Mohamadzadeh-Saghavaz et al., Cellulose-precipitated calcium carbonate composites and their effect on paper properties. Chemical Papers. 2014;68(6):774-781.

* cited by examiner

US 10,112,844 B2

CALCIUM CARBONATE MICROPARTICLES AND PROCESSES FOR PREPARING THEM

RELATED APPLICATIONS

This application is a U.S. national stage filing, under 35 U.S.C. § 371(c), of International Application No. PCT/JP2015/060200, filed on Mar. 31, 2015, which claims priority to Japanese Patent Application No. 2014-071680, filed on Mar. 31, 2014; Japanese Patent Application No. 2014-073570, filed on Mar. 31, 2014; and Japanese Patent Application No. 2014-073629, filed on Mar. 31, 2014. The entire contents of each of the aforementioned applications are incorporated herein by reference.

TECHNICAL FIELD

The present invention rebates to calcium carbonate micro particles and processes for preparing them. In particular, the present invention relates to techniques for preparing small-particle size calcium carbonates having an average primary particle size of less than 1 μm.

BACKGROUND ART

In general, calcium carbonates are mainly classified into "natural calcium carbonate" prepared from natural limestone, weathered shell or the like by mechanically grinding and classifying it and "synthetic calcium carbonate" (precipitated calcium carbonate) prepared from limestone by chemically reacting it. Known processes for synthesizing the synthetic calcium carbonate include the carbonation process, the lime-soda process, and the Solvay process, among winch the lime-soda process and the Solvay process are sometimes employed for special applications while industrial synthesis of calcium carbonate typically involves the carbonation process.

Synthesis of calcium carbonate by the carbonation process involves reacting quick lime and carbonic acid gas, and typically comprises a slaking step in which water is added to quick lime CaO to give slaked lime Ca(OH)$_2$, and a carbonation step in which carbonic acid gas $CO_2$ is injected, into the slaked lime to give calcium carbonate $CaCO_3$. At present, various techniques for controlling the particle shape or particle size or the like of the product calcium carbonate have been proposed by regulating reaction conditions in synthesis steps of calcium carbonate, particularly the carbonation step.

For example, patent documents 1 and 2 describe controlling the morphology or the like of calcium carbonate by adding a chelating agent during the carbonation step. Specifically, patent document 1 proposes a process for preparing well-dispersed calcium carbonate with little secondary aggregation by adding a material capable of forming a complex with metal ions during the carbonation reaction. On the other hand, patent document 2 proposes a process for preparing calcium carbonate having uniform mesopores by adding a sequestering agent at multiple stages during the carbonation step. Further, patent document 3 proposes controlling the shape of calcium carbonate by performing the carbonation reaction at two stages under specific conditions.

In addition, patent document 4 describes a technique for preparing calcium carbonate by supplying a reaction vessel with a suspension containing lime screen residues and a gas containing carbon dioxide while mixing them by an injector.

CITATION LIST

Patent Documents

Patent document 1: JPA 1998-72215
Patent document 2: JPA 2003-246617
Patent document 3: International Publication WO2004/108597
Patent document 4: JPA 2011-73892

SUMMARY OF INVENTION

Technical Problem

The present invention aims to provide techniques by which calcium carbonates having a small primary particle size can be prepared efficiently.

Solution to Problem

As a result of careful studies about the problems described above, we found that calcium carbonates having a small primary particle size can be prepared efficiently by synthesizing the calcium carbonates while injecting a liquid into a reaction vessel. Particularly according to the present invention, the resulting calcium carbonate microparticles have a very uniform shape with little variation between products.

Thus, the present invention includes, but not limited to, the following:

(1) A process for preparing calcium carbonate particles having an average primary particle size of less than 1 μm, comprising synthesizing calcium carbonate while injecting a liquid into a reaction vessel.
(2) The process as defined in (1), comprising reacting an aqueous suspension of slaked lime and a gas containing carbon dioxide.
(3) The process as defined in (1) or (2), comprising generating cavitation bubbles by injecting a liquid into a reaction vessel and synthesizing calcium carbonate in the presence of the cavitation bubbles.
(4) The process as defined in any one of (1) to (3), wherein the cavitation bubbles are generated by injecting an aqueous suspension of slaked lime into a reaction vessel.
(5) The process as defined in (1) or (2), comprising synthesizing calcium carbonate in the absence of cavitation bubbles.
(6) The process as defined in any one of (2) to (5), wherein the reaction solution circulated from the reaction vessel is used as the aqueous suspension of slaked lime.
(7) The process as defined in any one of (1) to (6), further comprising modifying the calcium carbonate particles.
(8) A calcium carbonate having an average primary particle size of less than 1 prepared by the process as defined in any one of (1) to (7)
(9) A product comprising the calcium carbonate panicles as defined in (8),
(10) The product as defined in (9), which is a sheet containing the calcium carbonate particles as an internal filler.
(11) The product as defined in (9), which is a coating color containing the calcium carbonate particles as a pigment.
(12) The product as defined in (9), which is a kneaded resin obtained by kneading the calcium carbonate particles with a resin.

Advantageous Effects of Invention

According to the present invention, calcium carbonate microparticles having an average primary particle size of less than 1 μm can be prepared with good efficiency by injecting a liquid into a reaction vessel.

The reason why calcium carbonate microparticles can be synthesized in a short time by injecting a liquid into a reaction vessel is not known in detail, but can be explained by the following assumption though the present invention is not bound to it. That is, it is assumed that the reaction is activated by fine bubbles generated by injecting a liquid into a reaction vessel so that calcium carbonate microparticles can be prepared with good efficiency.

DESCRIPTION OF EMBODIMENTS

Figure 1:
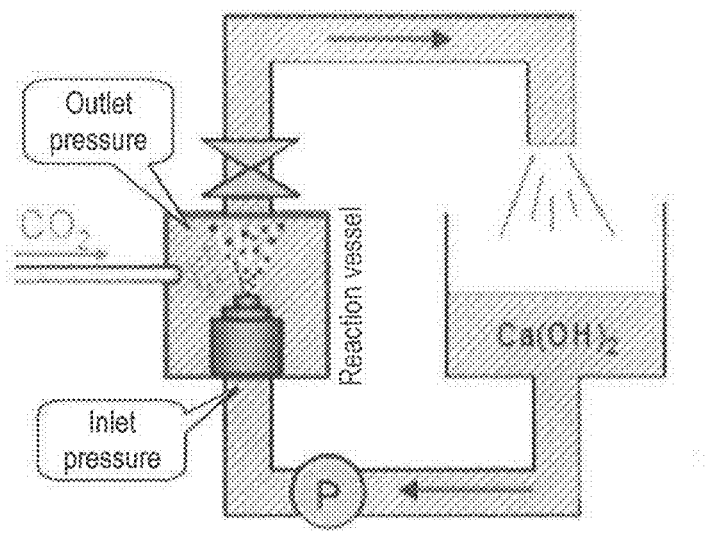
FIG. 1 is a schematic diagram showing the reaction system used in the examples of the present invention.
Figure 2:
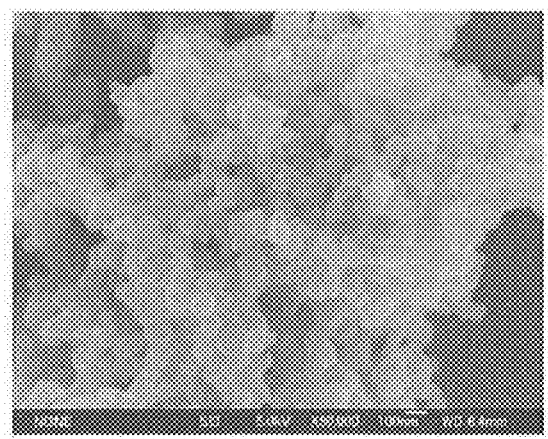
FIG. 2 is an electron micrograph of calcium carbonate microparticles synthesized in Experiment 1-1 (magnification: 50000×).
Figure 3:
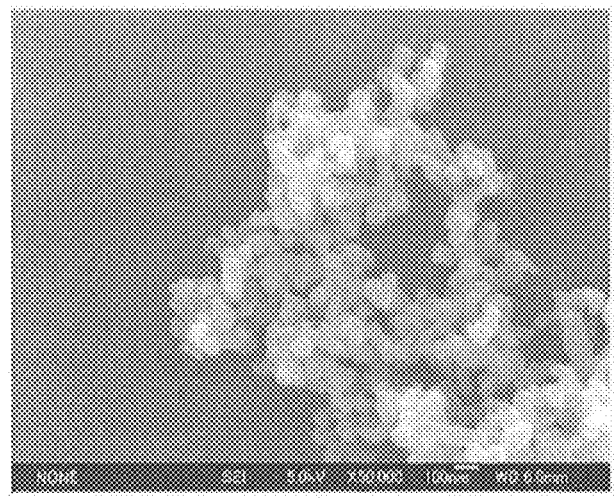
FIG. 3 is an electron micrograph of calcium carbonate microparticles synthesized in Experiment 1-4 (magnification: 50000×).
Figure 4:
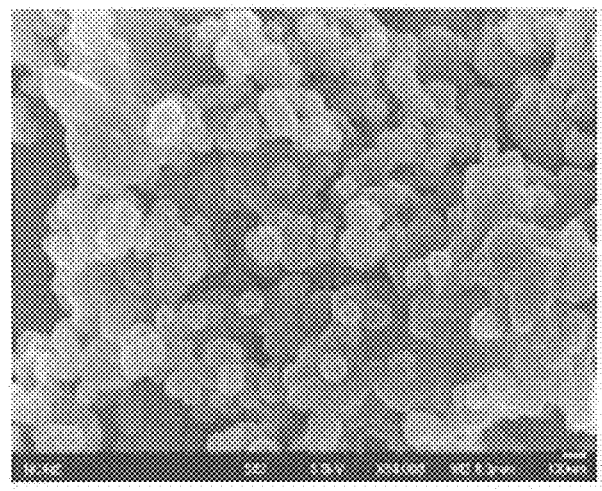
FIG. 4 is an electron micrograph of calcium carbonate microparticles synthesized in Experiment 1-5 (magnification: 50000×).
Figure 5:
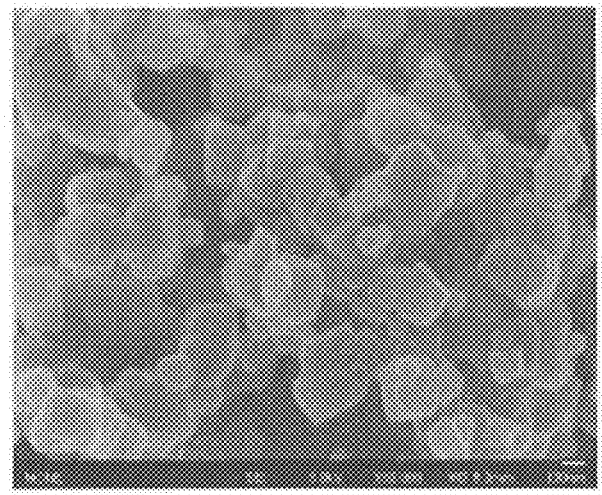
FIG. 5 is an electron micrograph of calcium carbonate microparticles synthesized in Experiment 1-6 (magnification: 50000×).
Figure 6:
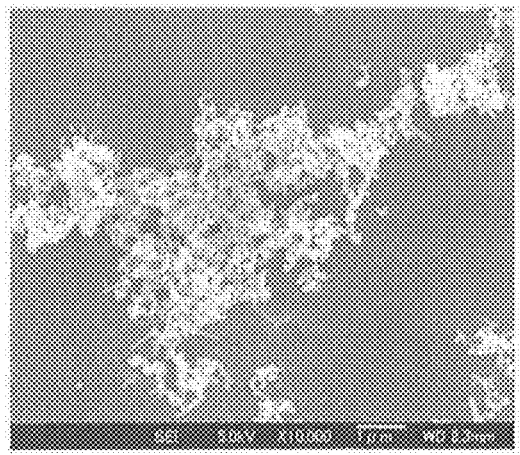
FIG. 6 is an electron micrograph of calcium carbonate microparticles (Sample 6) synthesized in Experiment 2 (magnification: 10000×).
Figure 7:
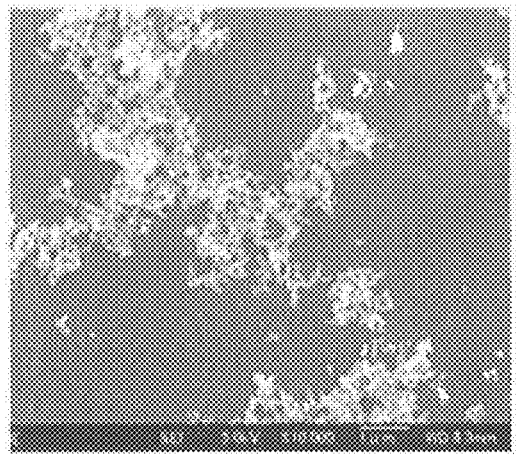
FIG. 7 is an electron micrograph of calcium carbonate microparticles (Sample 7) synthesized in Experiment 2 (magnification: 10000×).
Figure 8:
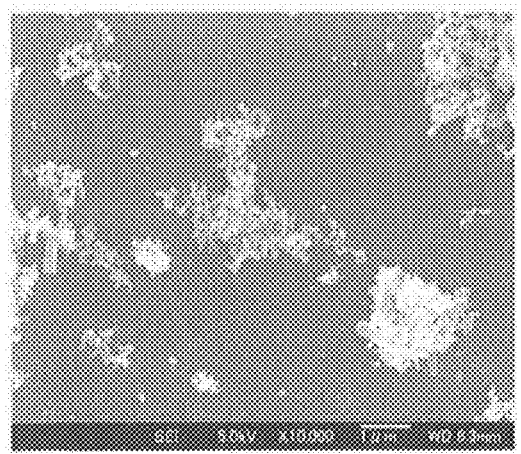
FIG. 8 is an electron micrograph of calcium carbonate microparticles (Sample 8) synthesized in Experiment 2 (magnification: 10000×).
Figure 9:
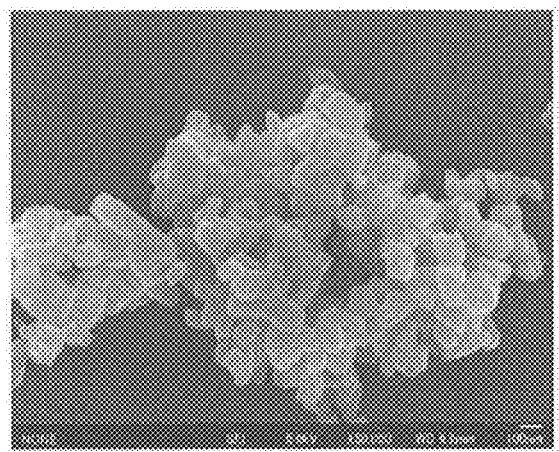
FIG. 9 is an electron micrograph of calcium carbonate microparticles (Sample 10) synthesized in Experiment 3 (magnification: 50000×).
Figure 10:
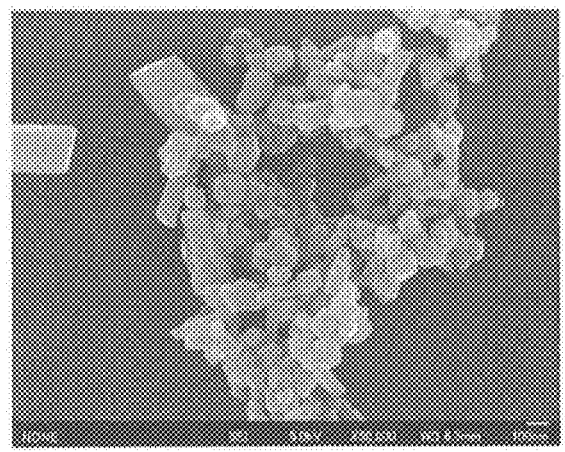
FIG. 10 is an electron micrograph of calcium carbonate microparticles (Sample 12) synthesized in Experiment 3 (magnification: 50000×).
Figure 11:
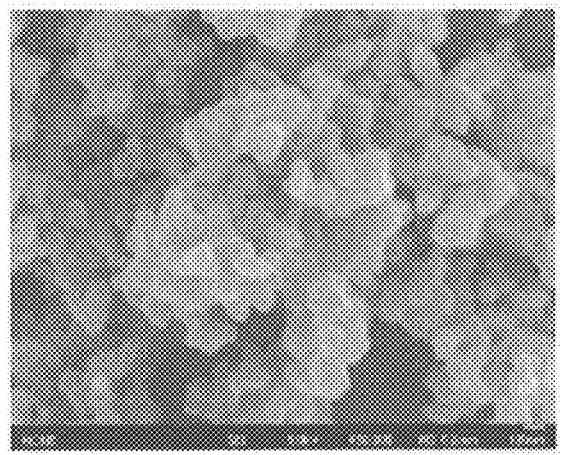
FIG. 11 is an electron micrograph of calcium carbonate microparticles (Sample 18) synthesized in Experiment 4 (magnification: 50000×).

In the present invention, calcium carbonate is synthesized in the presence of cavitation bubbles.

Calcium Carbonate

The preparation processes of the present invention make it possible to prepare calcium carbonates having a small average particle size efficiently. The calcium carbonate microparticles obtained by the present invention have an average primary particle size of less than 1 μm, and the present invention also makes it possible to prepare calcium carbonates having an average primary particle size of less than 500 nm, or calcium carbonates having an average primary particle size of 300 nm or less, or calcium carbonates having an average particle size of 200 nm or less. On the other hand, the calcium carbonate microparticles can have an average primary particle size of 10 nm or more.

Thus, the present invention makes it possible to provide calcium carbonate microparticles having a small particle size and a narrow particle size distribution so that they may have different properties from those of conventional calcium carbonates having a particle size of more than 1 μm for papermaking use.

The average particle size or shape or the like of the calcium carbonates obtained by the present invention can be identified, by electron microscopic observation. Further, the product calcium carbonates can also be qualitatively identified from the viscosity or the like of the calcium carbonate slurry.

Further, the calcium carbonates obtained by the present invention preferably have, for example, a BET specific surface area of 1 to 100 $m^2/g$, more preferably 20 to 100 $m^2/g$. In one embodiment, it may be 10 to 40 $m^2/g$. Further, the calcium carbonates obtained by the present invention preferably have an oil absorption of 50 to 250 mL/100 g in one embodiment, more preferably 80 to 250 mL/100 g. It should be noted that the particle size and specific surface area of the calcium carbonates obtained by the present invention can be adjusted by grinding or the like, such as wet or dry grinding using a bead mill, processing using a high, pressure homogenizes ultrasonic dispersion or the like, for example.

The complexes obtained by the present invention can be used for various applications and they can be widely used for any applications including, for example, papers, fibers, cellulosic composite materials, filter materials, coating colors, plastics and other resins, rubbers, elastomers, ceramics, glasses, tires, construction materials (asphalt, asbestos, cement, boards, concrete, bricks, tiles, plywoods, fiber boards and the like), various carriers (catalyst carriers, drug carriers, agrochemical carriers, microbial carriers and the like), adsorbents (decontaminants, deodorants, dehumidifying agents and the like), anti-wrinkle agents, clay, abrasives, modifiers, repairing materials, thermal insulation materials, damp proofing materials, water repellent materials, waterproofing materials, light shielding materials, sealants, shielding materials, insect repellents, adhesives, inks, cosmetics, medical materials, paste materials and the like. They also can be used for various fillers, coating agents and the like in the applications mentioned above. Among others, the calcium carbonate of the present invention is readily applied for papermaking purposes including, for example, printing papers, newsprint papers, Inkjet printing papers, PPC papers, kraft papers, woodfree papers, coated papers, coated fine papers, wrapping papers, thin papers, colored woodfree papers, east-coated papers, carbonless copy papers, label papers, heat-sensitive papers, various fancy papers, water-soluble papers, release papers, process papers, hanging base papers, incombustible papers, flame retardant papers, base papers for laminated boards, battery separators, cushion papers, tracing papers, impregnated papers, papers for ODP, building papers, papers for decorative building materials, envelope papers, papers for tapes, heat exchange papers, chemical fiber papers, aseptic papers, water resistant papers, oil resistant papers, heat resistant papers, photocatalytic papers, cosmetic papers (facial blotting papers and the like), various sanitary papers (toilet papers, facial tissues, wipers, diapers, menstrual products and the like), cigarette rolling papers, paperboards (liners, corrugating media, white paperboards and the like), base papers for paper plates, cup papers, baking papers, abrasive papers, synthetic papers and the like.

Further, the calcium carbonates obtained by the present invention can be used typically in combination with particles known as inorganic fillers and organic filler or various fibers. For example, inorganic fillers include calcium carbonate (precipitated calcium carbonate, ground calcium carbonate), magnesium carbonate, barium carbonate, aluminum, hydroxide, calcium hydroxide, magnesium hydroxide, zinc hydroxide, clay (kaolin, calcined kaolin, delaminated kaolin), tide, zinc oxide, zinc stearate, titanium dioxide, silica-containing products prepared from sodium silicate and a mineral acid (white carbon, silica/calcium carbonate complexes, silica/titanium dioxide complexes), terra alba, bentonite, diatomaceous earth, calcium sulfate, zeolite, inorganic fillers recycled from ash obtained in a deinking process and inorganic fillers consisting of complexes formed with silica or calcium carbonate during the recycling process, etc. In addition to calcium carbonate-silica complexes such as calcium carbonate and/or precipitated calcium carbonate-silica complexes, amorphous silicas such as white carbon can also be used. Organic fillers include urea-formaldehyde resins, polystyrene resins, phenol resins, hollow microparticles, acrylamide complexes, wood-derived materials (microfibers, microfibrillar fibers, kenaf powders), modified/insolubilized starches, ungelatinized starches and the like. Fibers that can be used include, without limitation, not only natural fibers such as celluloses but also synthetic fibers artificially synthesized from raw materials such as petroleum, regenerated fibers (semisynthetic fibers) such as rayon and lyocell, and even inorganic fibers and the like. In addition to the examples mentioned above, natural fibers include protein fibers such as wool and silk yarns and collagen fibers; complex carbohydrate fibers such as chitin-chitosan fibers and alginate fibers and the like. Examples of cellulosic raw materials include pulp fibers (wood pulps and non-wood pulps) and bacterial celluloses, among which wood pulps may be prepared by pulping wood raw materials. Examples of wood raw materials include softwoods such as *Pinus densiflora, Pinus thunbergii, Abies Sachalinensis, Picea jezoensis, Pinus koraiensis, Larix kaempferi, Abies firma, Tsuga sieboldii, Cryptoraeria japonica, Chamaecyparis obtusa, Larix kaempferi, Abies veitchii, Picea jezoensis* var. *hondoensis, Thujopsis dolabrata*, Douglas fir (*Pseudotsuga menziesii*), hemlock (*Conium maculatum*), white fir (*Abies concolor*), spruces, balsam fir (*Abies balsamea*), cedars, pines, *Pinus merkusii, Pinus radiata*, and mixed materials thereof; and hardwoods such as *Fagus crenata*, birches, *Alnus japonica*, oaks, *Machilus thunbergii, Castanopsis, Betula platyphylla, Populus nigra* var. *italica*, poplars, Fraxinus, *Populus maximowiczii*, Eucalyptus, mangroves, Meranti, Acacia and mixed materials thereof. The technique for pulping the wood raw materials is not specifically limited, and examples include pulping processes commonly used in the papermaking industry. Wood pulps can be classified by the pulping process and include, for example, chemical pulp obtained by digestion via the kraft process, sulfite process, soda process, polysulfide process or the like; mechanical pulp obtained by pulping with a mechanical force such as a refiner, grinder or the like; semichemical pulp obtained by pulping with a mechanical force after a chemical pretreatment; waste paper pulp; deinked pulp and the like. The wood pulps may have been unbleached (before bleaching) or bleached (after bleaching). Examples of non-wood pulps include cotton, hemp, sisal (*Agave sisalana*), abaca (*Musa textilis*), flax, straw, bamboo, bagas, kenaf and the like. The wood pulps and non-wood pulps may be unbeaten or beaten. Synthetic fibers include polyesters, polyamides, polyolefins, and acrylic fibers; semi-synthetic fibers include rayon, acetate and the like; and inorganic fibers include glass fiber, carbon fiber, various metal fibers and the like. All these may be used alone or as a combination of two or more of them.

Injection of a Liquid

In the present invention, calcium carbonate is synthesized while injecting a liquid into a reaction vessel. During then, cavitation bubbles can be generated by injecting the liquid under high pressure, or cavitation bubbles may not be generated by injecting the liquid under low pressure.

As used herein, the term "cavitation" refers to a physical phenomenon in which bubbles rapidly appear and disappear in a flowing fluid when it is subjected to a change in pressure. Bubbles generated by cavitation (cavitation bubbles) grow from very small "bubble nuclei" of 100 μm or less present in a liquid when the pressure drops below the saturated vapor pressure in the fluid only for an instant In the present invention, a liquid can be injected into a reaction vessel by known methods. In the present invention, a liquid can be injected under pressure into a pressure vessel. In the present invention, a liquid can be injected under pressure into a pressure vessel. In this embodiment, cavitation bubbles are preferably generated by injecting a liquid under high pressure using a pump or the like. Fluid jetting allows cavitation bubbles to be generated with high efficiency, whereby the cavitation bubbles have stronger collapse impact. In the present invention, calcium carbonate is synthesized in the presence of controlled cavitation bubbles, which are clearly distinguished from cavitation bubbles spontaneously occurring in fluid machinery and causing uncontrollable harms.

In the present invention, the reaction solution of a raw material or the like can be directly used and injected as a jet liquid, or some fluid can be injected into the reaction vessel. The fluid forming a liquid jet may be any of a liquid, a gas, or a solid such as powder or pulp or a mixture thereof so far as it is flowing. Moreover, another fluid such as carbonic acid gas can be added as an additional fluid to the fluid described above, if desired. The fluid described above and the additional fluid may be injected as a homogeneous mixture or may be injected separately.

The liquid jet refers to a jet of a liquid or a fluid containing solid particles or a gas dispersed or mixed in a liquid, such as a liquid jet containing a slurry of pulp or inorganic particles and bubbles. The gas here may contain bubbles generated by cavitation.

In the present invention, calcium carbonate can be synthesized under conditions where cavitation bubbles are not generated. Specifically, the pressure of the jetting liquid (upstream pressure) is 2 MPa or less, preferably 1 MPa or less, and then the pressure of the jetting liquid (downstream pressure) is released to 0.05 MPa or less.

Alternatively in the present invention, calcium carbonate can be synthesized under conditions where cavitation bubbles occur. The flow rate and pressure are especially important for cavitation because it occurs when a liquid is accelerated and a local pressure drops below the vapor pressure of the liquid. Therefore, the cavitation number c, which is a basic dimensionless number expressing a cavitation state, is defined as follows ("New Edition Cavitation: Basics and Recent Advance", Written and Edited by Yoji Katoh, Published by Makishoten, 1999),

[Formula 1]

$$\sigma = \frac{p_\infty - p_v}{\frac{1}{2}\rho U_{in}^2} \quad (1)$$

If the cavitation number here is high, it means that the flow site is in a state where cavitation is less likely to occur. Especially when cavitation is generated through a nozzle or an orifice tube as in the case of a cavitation jet, the cavitation number $\sigma$ can be rewritten by equation (2) below where $p_1$ is the nozzle upstream pressure, $p_2$ is the nozzle downstream pressure, and $p_v$ is the saturated vapor pressure of sample water, and the cavitation number a can be further approximated as shown by equation (2) below in a cavitation jet because the pressure difference between $p_1$, $p_2$ and $p_v$ is significant so that $p_1 \gg p_2 \gg p_v$ (H. Soyama, J. Soc. Mat. Sci. Japan, 47 (4), 381 1998).

[Formula 2]

$$\sigma = \frac{p_2 - p_v}{p_1 - p_2} \approx \frac{p_2}{p_1} \quad (2)$$

Cavitation conditions in the present invention are as follow: the cavitation number $\sigma$ defined above is desirably 0.001 or more and 0.5 or less, preferably 0.003 or more and 0.2 or less, especially preferably 0.01 or more and 0.1 or less. If the cavitation number a is less than 0.001, little benefit is attained because the pressure difference from the surroundings is small when cavitation bubbles collapse, but if it is greater than 0.5, the pressure difference in the flow is too small to generate cavitation.

When cavitation is to be generated by emitting a jetting liquid through a nozzle or an orifice tube, the pressure of the jetting liquid (upstream pressure) is more preferably 2 MPa or more and 15 MPa or less. Further, the pressure of the jetting liquid (upstream pressure) may be 5 MPa or more and 10 MPa or less. If the upstream pressure is less than 0.01 MPa, little benefit is attained because a pressure difference is less likely to occur from the downstream pressure. If the upstream pressure is higher than 30 MPa, a special pump and pressure vessel are required and energy consumption increases, leading to cost disadvantages. On the other hand, the pressure in the vessel (downstream pressure) is preferably 0.05 MPa or more and 0.9 MPa or less expressed in static pressure. Further, the ratio between the pressure in the vessel and the pressure of the jetting liquid is preferably in the range of 0.00.1 to 0.5.

The jet flow rate of the jetting liquid is desirably in the range of 1 m/sec or more and 200 m/sec or less, preferably in the range of 20 m/sec or more and 100 m/sec or less. If the jet flow rate is less than 1 m/sec, little benefit is attained because the pressure drop is too small to generate cavitation. If it is greater than 200 m/sec, however, special equipment is required to generate high pressure, leading to cost disadvantages.

In the present invention, cavitation may be generated in a reaction vessel where calcium carbonate is synthesized. The process can be run in one pass, or can be run through a necessary number of cycles. Further, the process can be run in parallel or in series using multiple generating means.

Liquid injection for generating cavitation may take place in a vessel open to the atmosphere, but preferably within a pressure vessel to control cavitation.

When cavitation is to be generated by liquid injection, the solids content of the aqueous suspension of slaked lime forming the reaction solution is preferably 30% by weight or less, more preferably 20% by weight or less. This is because cavitation bubbles are more likely to homogeneously act on the reaction system at such levels. Further, the solids content of the aqueous suspension of slaked lime forming the reaction solution is preferably 0.1% by weight or more in terms of the reaction efficiency, In the present invention, the pH of the reaction solution is basic at the beginning of the reaction, but changes to neutral as the carbonation reaction proceeds. Thus, the reaction can be controlled by monitoring the pH of the reaction solution.

In the present invention, stronger cavitation can be generated by increasing the jetting pressure of the liquid because the flow rate of the jetting liquid increases and accordingly the pressure decreases. Moreover, a stronger impact force can be produced by increasing the pressure in the reaction vessel because the pressure in the region where cavitation bubbles collapse increases and the pressure difference between the bubbles and the surroundings increases so that the bubbles vigorously collapse. This also helps to promote the dissolution and dispersion of carbon dioxide introduced. The reaction temperature is preferably 0° C. or more and 90° C. or less, especially preferably 10° C. or more and 60° C. or less. Given that the impact force is generally thought to be maximal at the midpoint between the melting point and the boiling point, the temperature is suitably around 50° C. in cases of aqueous solutions, though significant benefits can be obtained even at lower temperatures within the range defined above because there is no influence of vapor pressure.

In the present invention, the energy required for generating cavitation can be reduced by adding a surfactant. Surfactants that may be used include known or novel surfactants, e.g., nonionic surfactants, anionic surfactants, cationic surfactants and amphoteric surfactants such as fatty acid salts, higher alkyl sulfates, alkyl benzene sulfonates, higher alcohols, alkyl phenols, alkylene oxide adducts of fatty acids and the like. These may be used alone or as a mixture of two or more components. They may be added in any amount necessary for lowering the surface tension of the jetting liquid and/or target liquid.

Synthesis of Calcium Carbonate

In the present invention, calcium carbonate microparticles are synthesized while injecting a liquid into a pressure vessel using a known method for synthesizing calcium carbonate. For example, calcium carbonate can be synthesized by the carbonation process, soluble salt reaction, lime-soda process, Solvay process or the like, and in a preferred embodiment, calcium carbonate is synthesized by the carbonation process.

For preparing calcium carbonate by the carbonation process, lime is typically used as a calcium source to synthesize calcium carbonate through a slaking step in which water is added to quick lime CaO to give slaked lime $Ca(OH)_2$ and a carbonation step in which carbonic acid gas $CO_2$ is injected into the slaked lime to give calcium carbonate $CaCO_3$. During then, the suspension of slaked lime prepared by adding water to quick lime may be passed through a screen to remove less soluble lime particles contained in the suspension. Alternatively, slaked lime may be used directly as a calcium source. In cases where calcium carbonate is synthesized by the carbonation process in the present invention, the carbonation reaction may be performed in the presence of cavitation bubbles.

Reaction vessels typically known for preparing calcium carbonate by the carbonation process (carbonation reactors: carbonators) include gas injection carbonators and mechanically stirred carbonators. The gas injection carbonators inject carbonic acid gas into a carbonation reaction vessel containing a suspension of slaked lime (milk of lime) to react slaked lime with carbonic acid gas, but it is difficult to precisely control bubbles to have a uniform size simply by injecting carbonic acid gas, which imposes a limitation on the reaction efficiency. On the other band, the mechanically stirred carbonators are equipped with a stirrer inside the carbonators and introduce carbonic acid gas near the stirrer, whereby carbonic acid gas forms fine bubbles to improve the efficiency of the reaction between slaked lime and carbonic acid gas ("Handbook of Cement, Gypsum and Lime" published by GIHODO SHUPPAN Co., Ltd., 1995, page 495).

If the reaction solution had a high concentration or the carbonation reaction proceeded in cases where stirring took place with a stirrer provided within a carbonation reaction vessel such as mechanically stirred carbonators, however, the resistance of the reaction solution increased to make it difficult to thoroughly stir it and therefore make it difficult to precisely control the carbonation reaction or a considerable load was applied on the stirrer for thorough stirring, thus leading to energy disadvantages. Further, a gas injection port is located at a lower site of the carbonator, and blades of the stirrer are provided near the bottom of the carbonator to allow better stirring. Less soluble lime screen residues rapidly precipitate and always stay at the bottom so that, they block the gas injection port or disturb the balance of the stirrer. Moreover, conventional methods required not only a carbonator but also a stirrer and equipment for introducing carbonic acid gas into the carbonator, which also incurred much costs of equipment. In addition, the mechanically stirred carbonators improve the efficiency of the reaction between slaked lime and carbonic acid, gas by dispersing carbonic acid gas supplied near the stirrer as fine bubbles with the stirrer, but they failed to disperse carbonic acid gas as sufficiently fine bubbles when the concentration of the reaction solution was high or in other cases and they also sometimes had difficulty in precisely controlling the morphology or the like of the produced calcium carbonate in the carbonation reaction. In the present invention, calcium carbonate is synthesized in the presence of cavitation bubbles, whereby the carbonation reaction proceeds efficiently and uniform calcium carbonate microparticles can be prepared. Especially, the use of jet cavitation allows thorough stirring without any mechanical stirrer such as blades. In the present invention, previously known reaction vessels can be used, including the gas injection carbonators and the mechanically stirred carbonators as described above without, any problems as a matter of course, and these vessels may be combined with jet cavitation using a nozzle or the like.

In cases where calcium carbonate is synthesized by the carbonation process, the aqueous suspension of slaked lime preferably has a solids content of 0.1 to 40% by weight, more preferably 0.5 to 30% by weight, even more preferably about 1 to 20% by weight. If the solids content is low, the reaction efficiency decreases and the production cost increases, but if the solids content Is too high, the fluidity decreases and the reaction efficiency decreases. In the present invention, calcium carbonate is synthesized in the presence of cavitation bubbles so that the reaction solution and carbonic acid gas can be mixed well even if a suspension (slurry) having a high solids content is used.

The aqueous suspension containing slaked lime that can be used includes those typically used for the synthesis of calcium carbonate, and can be prepared by, for example, mixing slaked lime with water or by slaking (digesting) quick lime (calcium oxide) with water. The slaking conditions are not specifically limited, but may include, for example, a CaO concentration of 0.1% by weight or more, preferably 1% by weight or more, and a temperature of 20 to 100° C., preferably 30 to 100° C. Further, the average residence time in the slaking reaction vessel (slaker) is not specifically limited either, but can be, for example, 5 minutes to 5 hours, preferably 2 hours or less. It should be understood that the slaker may be batch or continuous. It should be noted that the present invention may use a carbonation reaction vessel (carbonator) and a slaking reaction vessel (slaker) separately, or may use one reaction vessel serving as both carbonation reaction vessel and slaking reaction vessel.

In the present invention, water is used for preparing the suspension or for other purposes, and the water that can be used includes common tap water, industrial water, groundwater, well water and the like, and also preferably includes ion exchanged water, distilled water, ultrapure water, industrial waste water, and water obtained during separation/dehydration of the calcium carbonate slurry issuing from the carbonation step.

Further in the present invention, the reaction solution can be circulated from the carbonation reaction vessel and used as a liquid containing calcium hydroxide. If the reaction solution is circulated in this way to increase contacts between the reaction solution and carbonic acid gas, the reaction efficiency increases and desired calcium carbonate can be easily obtained.

In the present invention, a gas containing carbon dioxide (carbonic acid gas) is injected into a reaction vessel where it is mixed with the reaction solution. According to the present invention, the carbonation reaction can be performed with good efficiency because carbonic acid gas can be supplied to the reaction solution without any gas feeder such as a fan, blower or the like, and carbonic acid gas is finely dispersed by cavitation bubbles.

In the present invention, the carbon dioxide concentration of the gas containing carbon dioxide is not specifically limited, but the carbon dioxide concentration is preferably higher. Further, the amount of carbonic acid gas introduced into the injector is not limited and can be selected as appropriate, but carbonic acid gas is preferably used at a flow rate of 100 to 10000 L/hr per kg of slaked lime, for example.

The gas containing carbon dioxide of the present invention may be substantially pure carbon dioxide gas or a mixture with, another gas. For example, a gas containing an inert gas such as air or nitrogen in addition to carbon dioxide gas can be used as the gas containing carbon dioxide. Further, gases containing carbon dioxide other than carbon dioxide gas (carbonic acid gas) that can be suitably used include exhaust gases discharged from incinerators, coal boilers, heavy oil boilers and the like of papermaking factories. In addition, the carbonation reaction can also be performed using carbon dioxide generated from lime calcination, processes.

In the processes for preparing calcium carbonate of the present invention, various known auxiliaries can also be added. For example, chelating agents can be added in the carbonation reaction, specifically including polyhydroxycarboxylic acids such, as citric acid, malic acid, and tartaric acid; dicarboxylic acids such as oxalic acid; sugar acids such as gluconic acid; aminopolycarboxylic acids such as iminodiacetic acid and ethylenediamine tetraacetic acid and alkali metal salts thereof; alkali metal salts of polyphosphoric acids such as hexametaphosphoric acid and tripolyphosphoric acid; amino acids such as glutamic acid and aspartic acid and alkali metal acids thereof; ketones such as acetylacetone, methyl acetoacetate and allyl acetoacetate; sugars such as sucrose; and polyols such as sorbitol. Surface-treating agents can also be added, including saturated fatty acids such as palmitic acid and stearic acid; unsaturated fatty acids such as oleic acid and linoleic acid; resin acids such as alicyclic carboxylic acids and abietic acid as well as salts, esters and ethers thereof; alcoholic activators, sorbitan fatty acid esters, amide- or amine-based surfactants, polyoxyalkylene alkyl ethers, polyoxyethylene nonyl phenyl ether, sodium alpha-olefin sulfonate, long-chain alkylamino acids, amine oxides, alkylamines, quaternary ammonium salts, aminocarboxylic acids, phosphonic acids, polycarboxylic acids, fused phosphoric acid and the like. Further, dispersants can also be used, if desired. Such dispersant include, for example, sodium polyacrylate, sucrose fatty acid esters, glycerin fatty acid esters, acrylic acid-maleic acid copolymer ammonium salts, methacrylic acid-naphthoxypolyethylene glycol acrylate copolymers, methacrylic acid-polyethylene glycol monomethacrylate copolymer ammonium salts, polyethylene glycol monoacrylate and the like. These can be used alone or as a combination of two or more of them. They may be added before or after the carbonation reaction. Such additives can be added preferably in an amount of 0.001 to 20%, more preferably 0.1 to 10% of slaked lime.

Further in the present invention, materials that are not directly involved in the carbonation reaction but taken up into the product calcium carbonate to produce composite particles can be used. Such materials include fibrous materials represented by pulp fibers, inorganic particles, organic particles, polymers and the like, and specifically fibrous materials collected from waste water of papermaking factories may be supplied to the carbonation reaction of the present invention, for example. Various composite particles including those of various shapes such as fibrous particles can be synthesized by supplying such materials to the reaction vessel.

Reaction Conditions

In the present invention, the conditions of the carbonation reaction are not specifically limited, and appropriately selected depending on the purposes. For example, the temperature of the carbonation reaction can be 0 to 90° C., preferably 10 to 70° C. The reaction temperature can be controlled by regulating the temperature of the reaction solution using a temperature controller, and if the temperature is low, the reaction efficiency decreases and the cost increases, but if it exceeds 90° C., coarse calcium carbonate particles tend to increase.

Further in the present invention, the carbonation reaction can be a batch reaction or a continuous reaction. Typically, the reaction is preferably performed as a batch process because of the convenience in removing residues after the carbonation reaction. The scale of the reaction is not specifically limited, and can be 100 L or less, or more than 100 L. The volume of the reaction vessel can be, for example, about 10 L to 100 L, or may be about 100 L to 1000 L, Further, the carbonation reaction can be controlled by monitoring the pH of the reaction suspension, and the carbonation reaction can be conducted until the pH reaches less than pH9, preferably less than pH8, more preferably around pH7, for example, depending on the pH profile of the reaction solution.

Alternatively, the carbonation reaction can be controlled by monitoring the conductivity of the reaction solution. The carbonation reaction is preferably conducted until the conductivity drops to 1 mS/cm or less, Furthermore, the carbonation reaction can also be controlled by the reaction period, and specifically it can be controlled by adjusting the period during which the reactants stay in the reaction vessel. Additionally, the reaction can also be controlled in the present invention by stirring the reaction solution in the carbonation reaction vessel or performing the carbonation reaction as a multistage reaction.

In the present invention, the reaction product calcium carbonate is obtained as a suspension so that it can be stored in a storage tank or subjected to processing such as concentration/dehydration, grinding, classification, aging, or dispersion, as appropriate. These can be accomplished by known processes, which may be appropriately selected taking into account the purposes, energy efficiency and the like. For example, the concentration/dehydration process is performed by using a centrifugal dehydrator, thickener or the like. Examples of such centrifugal dehydrators include decanters, screw decanters and the like. If a filter or dehydrator is used, the type of it is not specifically limited either, and those commonly used can be used, including, for example, pressure dehydrators such as filter presses, drum filters, belt presses and Tube presses or vacuum drum filters such as Oliver filters or the like, which can be suitably used to give a calcium carbonate cake. Classification means include sieves such as meshes, outward or inward flow slotted or round-hole screens, vibrating screens, heavyweight contaminant cleaners, lightweight contaminant cleaners, reverse cleaners, screening testers and the like. Dispersion means include high speed dispersers, low speed kneaders and the like.

In the present invention, sieving can be performed to separate unreacted components and calcium carbonate in the reaction solution by using, for example, a wet vibrating sieve.

The calcium carbonate obtained by the present invention may be compounded into a filler or pigment as a suspension without being completely dehydrated, or may be dried into powder. The dryer used here is not specifically limited either, but air-flow dryers, band dryers, spray dryers and the like can be suitably used, for example.

Further, the calcium carbonate obtained by the present invention often takes the form of secondary particles resulting from the aggregation of fine primary particles, wherein the secondary particles can be produced to suit the purposes through an aging process or can be produced by dividing aggregates by grinding. Grinding means include ball mills, sand grinder mills, impact mills, high pressure homogenizers, low pressure homogenizers, Dyno mills, ultrasonic mills, calender roll grinders, attritors, millstone type mills, vibration mills, cutter mills, jet mills, breakers, beaters, single screw extruders, twin screw extruders, ultrasonic stirrers, juicers/mixers for home use, etc.

The calcium carbonate obtained by the present invention can be modified by known methods. In an embodiment, for example, it can be hydrophobized on the surface to enhance the miscibility with resins or the like,

EXAMPLES

The following examples further illustrate the present invention, but the present invention is not limited, to these examples. Unless otherwise specified, the concentrations, parts and the like as used herein are based on weight, and the numerical ranges are described to include their endpoints.

Experiment 1: Synthesis of Calcium Carbonate Microparticles (Part 1)

An aqueous suspension containing calcium hydroxide (slaked lime Ca (OH)$_2$ from Wako Pure Chemical Industries, Ltd., 2 to 15% by weight) was provided. 9.5 L of this aqueous suspension poured into a 45 L reservoir tank and then the suspension and carbon dioxide was injected into the vessel to synthesize calcium carbonate microparticles. The reaction temperature was about 25° C., the carbonic acid gas used had a purity of 100% (at an injection flow rate of 4 to 12 L/min), and the reaction was stopped when the pH of the reaction solution reached about 7 (from the pH of about 12.8 before the reaction)

During the synthesis of calcium carbonate, the reaction was performed by circulating the reaction solution and injecting it into the reaction vessel, as shown in FIG. 1. Specifically, the reaction solution was injected into the pressure vessel through a nozzle (nozzle diameter: 1.5 mm) at an injection rate of about 70 m/s under the inlet pressures (upstream pressures) and outlet pressures (downstream pressures) shown in the table below. It should be noted that cavitation bubbles occurred in the reaction vessel in Experiments 1-1, 1-2, 1-3, and 1-4 because the injection pressure was high, while cavitation bubbles did not occur in the reaction vessel in Experiments 1-5 and 1-6 because the injection pressure was low (no CV).

As a comparative example, calcium carbonate was synthesized by a batch process without injecting any liquid (Experiment 1-7). Specifically, 30 L of a calcium hydroxide shiny (3%) was introduced into a batch-type baffled Cowles mixer (an opened cylinder mixer having a volume of 50 L) and adjusted to 15° C., and then a carbon dioxide-containing gas was injected at a rate of 9 L/min while stirring at a peripheral stirring speed of 2.6 m/s (500 rpm), and the reaction was stopped when the pH of the reaction solution reached about 7 (from the pH of about 12.8 before the reaction). The resulting slurry was filtered through a 325-mesh sieve to remove coarse particles.

The resulting calcium carbonates were measured for their BET specific surface area, and oil absorption, and photographed with an electron microscope. The measurement of oil absorption was performed according to the method defined in JIS K5101, When the reaction solution was injected at an injection pressures under which no cavitation bubbles were generated (Experiments 1-5 and 1-6), calcium carbonate microparticles having an average particle size of about 200 nm or less could be synthesized, When the injection pressure was increased to generate cavitation bubbles (Experiments 1-1, 2, 3, and 4), very small-particle size calcium carbonates having an average particle size of 200 nm or less and a very uniform particle shape could be prepared even if the reaction period was as short as 4 to 6 minutes. When the outlet pressure under which cavitation occurred was somewhat increased (Experiment 1-2), calcium carbonate microparticles could also be synthesized with good efficiency in the same manner as in Experiment 1-1. Even when the flow rate of carbonic acid gas injected into the reaction vessel was decreased from 12 L/min (Experiment 1-1) to 4 L/min (Experiment 1-3), microparticles of calcium carbonate could be prepared. Further, even when the concentration of the aqueous suspension of the raw material slaked lime was changed from 2% (Experiment 1-1) to 15% (Experiment 1-4), microparticles of calcium carbonate could be prepared by prolonging the reaction period, When no liquid was injected into the reaction vessel (Experiment 1-7), however, spindle-shaped particles having a primary particle size of about 50 nm×1000 nm were formed but microparticles of calcium carbonate could not be prepared.

Experiment 2: Synthesis of Calcium Carbonate Microparticles (Part 2: Change of the Inlet Pressure)

Calcium carbonate microparticles were synthesized in the same manner as described for Sample 1 in Experiment 1 except that the inlet pressure for cavitation and the injection flow rate of carbonic acid gas were changed as shown in the table below (and the suspension of calcium hydroxide was used in an amount of 12 L).

The calcium carbonates thus obtained were measured for their BET specific surface area and oil absorption, and photographed with an electron microscope.

The electron micrographs were observed to show that calcium carbonate microparticles having a primary particle size of 100 nm or less could be synthesized at any inlet pressure by synthesizing the calcium carbonates by means of cavitation according to the present invention.

TABLE 1

| | Pressure | | Ca(OH)2 concentration | Carbon dioxide flow rate L/min | Reaction period min | Start temp ° C. | End temp ° C. | Primary particle size nm | (average) | BET surface area m2/g | Oil absorption mL/100 g |
|---|---|---|---|---|---|---|---|---|---|---|---|
| | Inlet | Outlet | | | | | | | | | |
| 1-1 | | 0.3 MPa | | 12 | 4 | 26 | 35 | 50-130 | 100 | 21.6 | 105 |
| 1-2 | 7 MPa | 0.4 MPa | 2% | | 3.5 | 27 | 34 | 50-170 | 120 | 19.2 | 147 |
| 1-3 | | 0.3 MPa | | 4 | 6 | 24 | 36 | 40-110 | 80 | 22.8 | 160 |
| 1-4 | | | 15% | 12 | 26 | 25 | 84 | 30-80 | 70 | 31.5 | 126 |
| 1-5 | 1 MPa | 0.05 Mpa | 2% | 10 | 7.5 | 11 | 16 | 80-200 | 100 | 16.5 | 68 |
| 1-6 | | (No CV) | 10% | | 39 | 12 | 35 | 70-300 | 200 | 10.2 | 99 |
| 1-7 | 0 MPa | 0 MPa | 3% | 9 | 31 | 15 | 20 | (spindle-shape) | 500 × 1000 | 8.5 | 130 |

TABLE 2

|   | Pressure Inlet | Pressure Outlet | Carbon dioxide flow rate L/min | Reaction period min | Start temp °C. | End temp °C. | Primary particle size nm | (average) | BET surface area m2/g | Oil absorption mL/100 g |
|---|---|---|---|---|---|---|---|---|---|---|
| 6 | 3 MPa |  | 3 | 10.5 | 20 | 26 | 30-110 | 90 | 32.8 | 160 |
| 7 | 7 MPa | 0.3 Mpa | 1.5 | 23.0 | 20 | 40 | 50-160 | 110 | 30.0 | 169 |
| 8 | 14 MPa |  | 3 | 11.5 | 23 | 47 | 30-130 | 90 | 35.6 | 169 |

Experiment 3: Synthesis of Calcium Carbonate Microparticles (Part 3): Additives

Calcium carbonate microparticles were synthesized in the same manner as described for Sample 1 in Experiment 1 except that various additives were added. Specifically, they were synthesized as follows.
(Sample 9: sugar) Calcium carbonate microparticles were synthesized in the same manner as described for Sample 1 after a sugar (granulated sugar) was added at a level of 5% by weight of calcium hydroxide into the reaction vessel.
(Samples 10 and 11: cationic polymer) Calcium carbonate microparticles were synthesized by adding a cationic polymer (having a charge density of 0.58 meq./g and available as GS-3 from Harima Chemicals Group, Inc.) at a level of 1% by weight of calcium hydroxide into the reaction vessel. The cationic polymer was added to Sample 10 before the reaction while it was added to Sample 11 after the reaction.
(Sample 12: rosin) Calcium carbonate microparticles were synthesized by adding rosin (the rosin sizing agent CC1401 from SEIKO PMC CORPORATION) at a level of 1% by weight of calcium hydroxide into the reaction vessel. The rosin was added into the reaction vessel before the reaction
(Samples 13 to 15: palmitic acid) Calcium carbonate microparticles were synthesized by adding palmitic acid (from Wako Pure Chemical Industries, Ltd.) at a level of 5% by weight of calcium hydroxide into the reaction vessel. The experiment was performed by adding palmitic acid at different instants, i.e., "pre-reaction" (Sample 13) means that palmitic acid was added into the reaction vessel before the reaction; "post-reaction/heating" (Sample 14) means that palmitic acid was dispersed in a small amount of water and then molten by heating in a hot bath at about 95° C., and added after completion of the carbonation reaction; and "post-reaction/saponification" (Sample 15) means that an aqueous sodium hydroxide solution was added to palmitic acid and then heated in a hot bath at about 95° C., and added after completion of the carbonation reaction.
(Samples 16 and 17: dispersant) Calcium carbonate microparticles were synthesized by adding a dispersant (ARON T50 from Toagosei Co., Ltd.) at a level of 0.5% by weight of calcium hydroxide into the reaction vessel. The dispersant was added to Sample 16 before the reaction while it was added to Sample 17 after the reaction.

The calcium carbonates thus obtained were measured for their BET specific surface area and oil absorption, and photographed with an electron microscope.

Electron microscopic observation shows that calcium carbonate microparticles having a primary particle size of about 100 nm could also be synthesized by synthesizing the calcium carbonates by means of cavitation according to the present invention when various additives were added (Samples 9 to 17) in the same manner as the case where no additive was added (Sample 1). Further, it was shown that the particle size of calcium carbonate microparticles tended to increase when a cationic polymer was added before the reaction and that the likelihood of cohesion of calcium carbonate microparticles decreased when rosin was added before the reaction

TABLE 3

| # | Additive Type | Additive Amount | Additive Timing | Carbon dioxide flow rate L/min | Reaction period min | Start temp °C. | End temp °C. | Primary particle size nm | (average) | BET surface area m2/g | Oil absorption mL/100 g |
|---|---|---|---|---|---|---|---|---|---|---|---|
| 9 | Sugar | 5% | Pre-reaction |  | 3.5 | 27 | 35 | 50-110 | 80 | 18.0 | 121 |
| 10 | Cationic | | Pre-reaction |  | 4 | 25 | 33 | 70-140 | 110 | 13.4 | 145 |
| 11 | polymer | 1% | Post-reaction |  | 3 | 25 | 26 | 70-130 | 100 | 14.8 | 107 |
| 12 | Rosin | | Pre-reaction |  | 3.5 | 25 | 35 | 50-120 | 90 | 20.1 | 133 |
| 13 |  | | Pre-reaction | 12 | 3.5 | 28 | 36 | 60-120 | 90 | — | — |
| 14 | Palmitic acid | 5% | Post-reaction (heating) |  | 4 | 26 | 35 | 90-140 | 110 | — | — |
| 15 |  | | Post-reaction (saponification) |  | 4 | 26 | 35 | 50-130 | 90 | — | — |
| 16 | Dispersant | 0.5% | Pre-reaction |  | 1.5 | 12 | 20 | 39 | 80-200 | 180 | — | — |
| 17 |  | | Post-reaction |  | 1.5 | 12 | 30 | 54 | 30-160 | 70 | — | — |

Experiment 4: Synthesis of Calcium Carbonate Microparticles (Part 4: Scale-Up)

A scale-up experiment for synthesizing calcium carbonate microparticles was performed. Calcium carbonate microparticles were synthesized in the same manner as in Experiment 1 except that a 500-L reaction system was used and the amount of the 2% aqueous suspension of slaked lime was 100 L.

The results are shown in the table below and Id cure 11 (Sample 18),

TABLE 4

| # | Pressure Inlet | Pressure Outlet | Ca(OH)2 concentration | Carbon dioxide flow rate L/min | Reaction period min | Start temp °C. | End temp °C. | Primary particle size (average) nm | BET surface area m2/g | Oil absorption mL/100 g |
|---|---|---|---|---|---|---|---|---|---|---|
| 18 | 7 MPa | 0.3 MPa | 2% | 12 | 54 | 39 | 68 | 40-90    70 | 21.3 | 143.9 |

Experiment 5: Synthesis of Calcium Carbonate Microparticles (Part 5: Use of a Twin-Fluid Nozzle)

Figure 12:
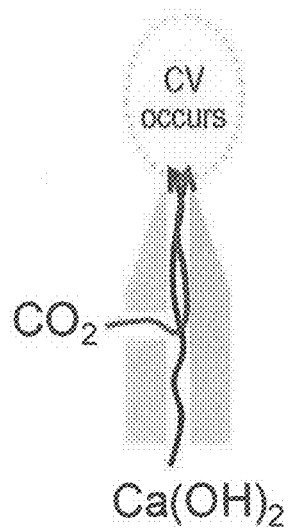
FIG. 12 is a schematic diagram showing the twin-fluid nozzle used in Experiment 5.
Figure 13:
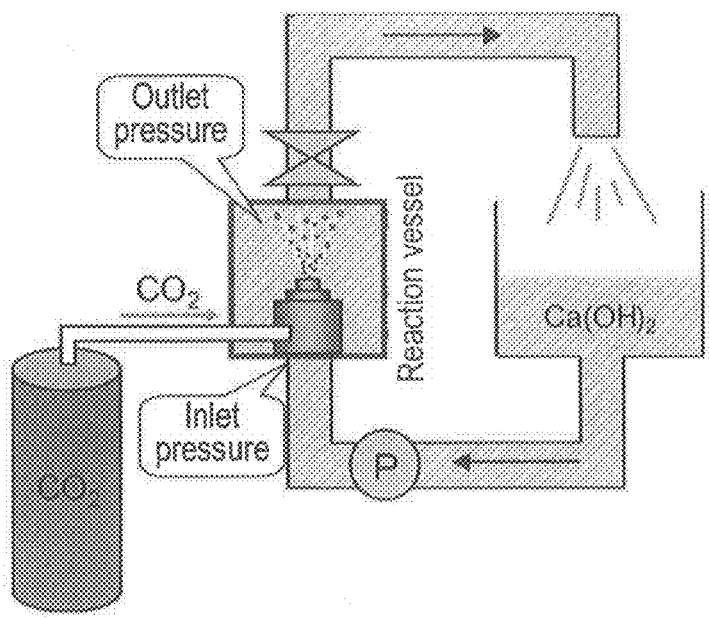
FIG. 13 is a schematic diagram showing the reaction system used in Experiment 5.

Calcium carbonate microparticles were synthesized by injecting a suspension of slaked lime and carbon dioxide gas into the reaction vessel while they were combined using a twin-fluid nozzle as shown in FIG. 12. Calcium carbonate microparticles were synthesized basically in the same manner as in Experiment 1 using a reaction system shown by a schematic diagram in FIG. 13. It should be noted that the open area (X) shown in the table refers to the area ratio of the open area of the twin-fluid nozzle to the open area of the nozzle used in Experiment 1.

Figure 14:
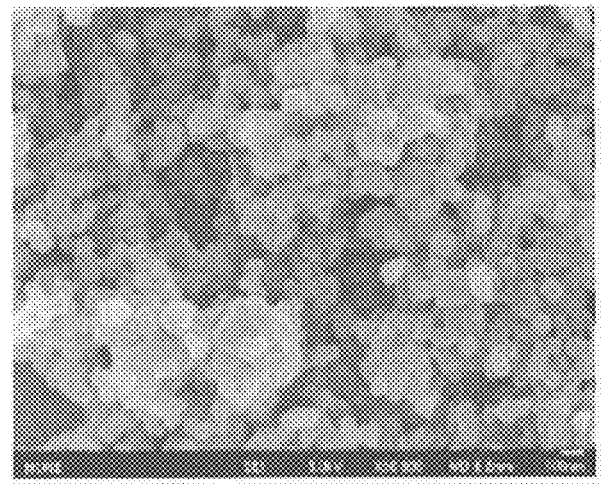
FIG. 14 is an electron micrograph of calcium carbonate microparticles (Sample 19) synthesized in Experiment 5 (magnification: 50000×).

Experiment 5-1: Sample 19, FIG. 14

Synthesis was performed in the same manner as in Experiment 1 except that the cavitation inlet, pressure was 3.5 MPa and the carbon dioxide flow rate was 10 L/min.

Figure 15:
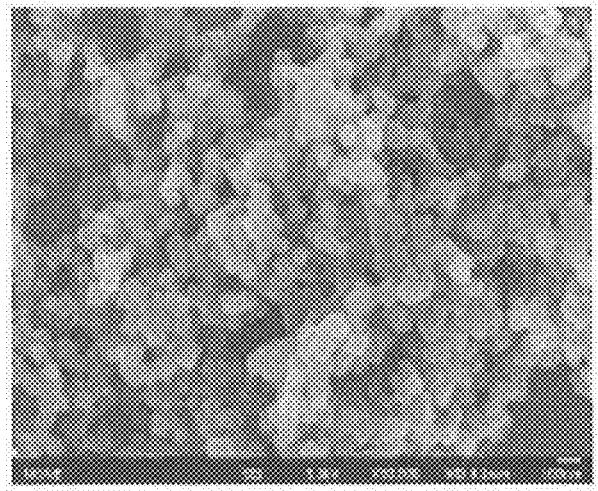
FIG. 15 is an electron micrograph of calcium carbonate microparticles (Sample 20) synthesized in Experiment 5 (magnification: 50000×).

Experiment 5-2: Sample 20, FIG. 15

Synthesis was performed in the same manner as in Experiment 1 except that the carbon dioxide flow rate was 10 L/min.

Figure 16:
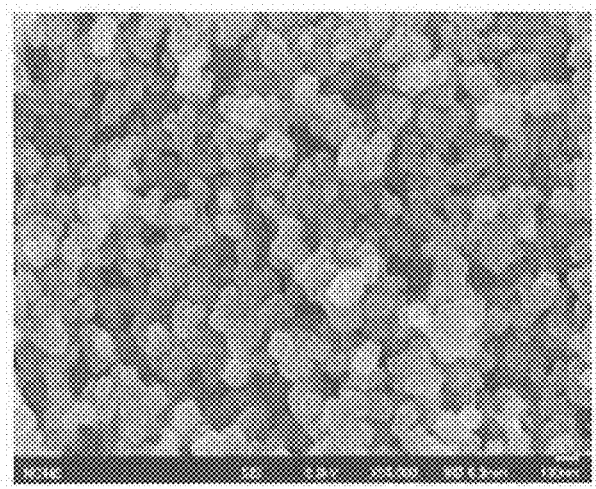
FIG. 16 is an electron micrograph of calcium carbonate microparticles (Sample 21) synthesized in Experiment 5 (magnification: 50000×).

Experiment 5-3: Sample 21, FIG. 16

Synthesis was performed in the same manner as described for Sample 20 except that the carbon dioxide flow rate was 5 L/min.

The results are shown in the table below and the figures, proving that calcium carbonate microparticles having a primary particle size of 100 nm or less could be synthesized according to the present invention.

After the reaction, the slurry was spread over a cover glass and dried, and then the contact angle was measured using a dynamic contact angle tester (1100DAT from Fibro System AB) at 0.1 second, after a water drop was placed.

As shown in the table below, the contact angle was 0° before sodium oleate was added, but 140° after it was added, confirming that the calcium carbonate was hydrophobized by adding the oleate.

TABLE 6

| Before or after adding an oleate | | |
|---|---|---|
| | Before | After |
| Contact angle (°) | 0 | 140 |

Experiment 7: Synthesis of Calcium Carbonate Microparticles (Part 7: Multistage Reaction)

Calcium, carbonate microparticles were synthesized by further injecting carbonic acid gas Into the calcium carbonate microparticles synthesized in Experiment 1. To a slurry (consistency 17%, 3540 g) of Sample 4 was added 600 g of slaked lime, and the mixed slurry was diluted with tap water to a total amount of 12 L. This reaction solution was used and reacted with carbonic acid gas in the presence of cavitation bubbles under similar conditions as described for Sample 5 in Experiment 1 to synthesize calcium carbonate microparticles (Sample 22).

Figure 17:
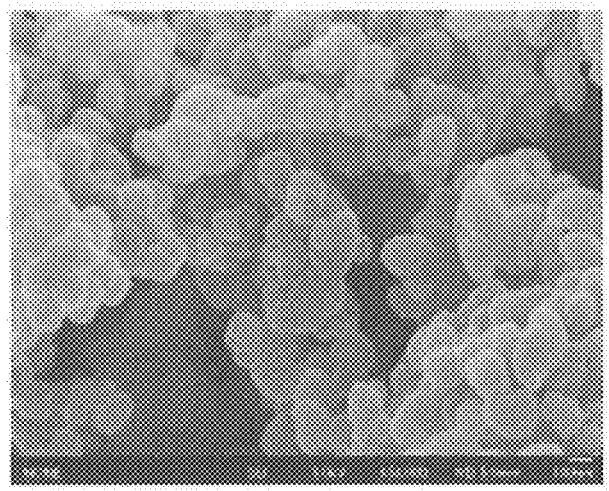
FIG. 17 is an electron micrograph of calcium carbonate microparticles (Sample 24) synthesized in Experiment 7 (magnification: 50000×).

The results are shown in the table below and FIG. 17. The experimental results show that calcium carbonate micropar-

TABLE 5

| # | Open area* | Pressure Inlet | Pressure Outlet | Ca(OH)2 concentration | Carbon dioxide flow rate L/min | Reaction period min | Start temp °C. | End temp °C. | Primary particle size (average) nm | BET surface area m2/g | Oil absorption mL/100 g |
|---|---|---|---|---|---|---|---|---|---|---|---|
| 19 | X2.3 | 3.5 MPa | 0.3 MPa | | 10 | 6.5 | 12 | 20 | 50-120   80 | 24.2 | 103 |
| 20 | X1.1 | 7 MPa | 0.3 MPa | 2% | | 6.5 | 12 | 22 | 50-80    60 | 22.7 | 93 |
| 21 | | | | | 5 | 10.5 | 12 | 26 | 50-100   90 | 24.1 | 93 |

Experiment 6: Synthesis of Calcium Carbonate Microparticles (Part 6: Hydrophobization)

An experiment for modifying calcium carbonate microparticles was performed. The slurry of Sample 4 in Experiment 1 was thickened, by natural sedimentation (consistency 24%, 650 mL), and to this was added sodium oleate (4.6 g) dissolved in hot water (30 mL) at 90° C., and the mixture was stirred with a laboratory mixer for 5 minutes.

ticles could also be synthesized when calcium carbonate was synthesized by further adding slaked lime to the calcium carbonate microparticles already synthesized. Electron microscopic observation (50,000×) shows that the calcium carbonate microparticles obtained in this experiment had an average particle size of about 180 nm as compared with the calcium carbonate microparticles of Sample 4 having an average particle size of about 70 nm, indicating that the particle size of the calcium carbonate microparticles could be readily controlled via a multistage reaction.

TABLE 7

| # | Pressure | | Ca(OH)2 concentration | Carbon dioxide flow rate L/min | Reaction period min | Start temp ° C. | End temp ° C. | Primary particle size nm | (average) |
|---|---|---|---|---|---|---|---|---|---|
| | Inlet | Outlet | | | | | | | |
| 22 | 7 MPa | 0.3 MPa | 5% | 12 | 20.5 | 17 | 51 | 100-250 | 180 |

Experiment 8: Evaluation of Calcium Carbonate Microparticles (Adhesion to Pulp Fibers)

The adhesion of the calcium carbonate microparticles to pulp fibers was evaluated by the procedure as follows. As shown below, calcium carbonate microparticles having a primary particle size of 1 µm or less could easily be adhered to fibers simply by mixing the fibers and the calcium carbonates.

Figure 18:
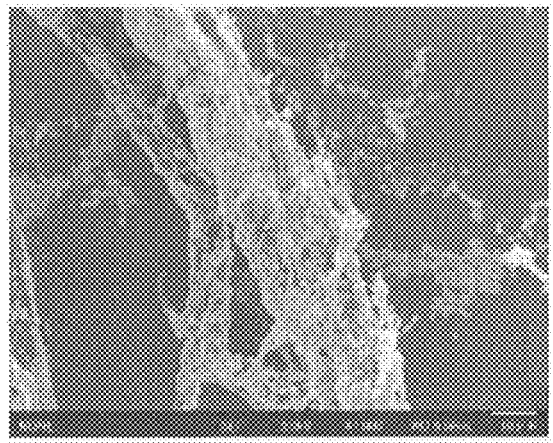
FIG. 18 is an electron micrograph of Sample D1 obtained in Experiment 8-1 (magnification: 1000×).

Experiment 8-1, FIG. 18

In a dynamic drainage jar (DM, 200-mesh, 800 rpm), 0.45 g of an LBKP (CSF=460 mL) and 2.05 g of a precipitated calcium carbonate (Sample 21 of Experiment 5-3) were stirred and then dehydrated.

The resulting sample was dispersed in a large amount of ethanol, and the calcium, carbonate unadhered to fibers was separated, and then the surfaces of the fibers were observed by electron microscopy (magnification 1000×). As shown in the figure, the calcium carbonate microparticles in the resulting sample (D1) spontaneously adhered to the fibers and completely covered the surfaces of the fibers despite the fact that any chemicals such as binders were not added.

Figure 19:
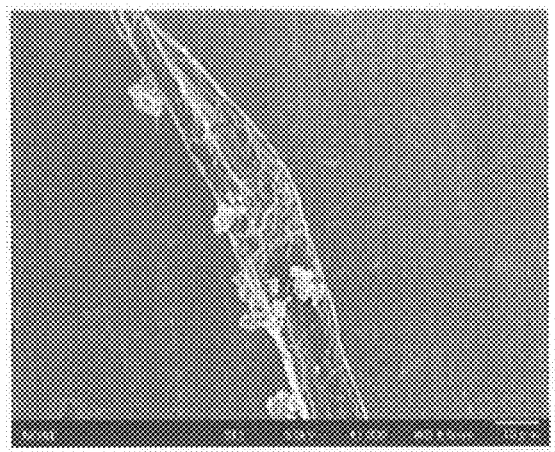
FIG. 19 is an electron micrograph of Sample D1 obtained in Experiment 8-2 (magnification: 1000×).

Experiment 8-2, FIG. 19

The adhesion of calcium carbonate to fibers was evaluated in the same manner as in Experiment 8-1 except that a precipitated calcium carbonate having an average particle size of about 3.5 pin was used in place of Sample 21.

The resulting complex, was dispersed in a large amount of ethanol, and the calcium carbonate unadhered to fibers was separated and then the surfaces of the fibers were observed by electron microscopy (magnification 1000×). As shown in the figure, the calcium carbonate particles having an average particle size of 3.5 µm deposited as aggregates sporadically on the fibers but few of them spontaneously adhered to them.

Experiment 9: Preparation of Papers Containing Calcium Carbonate Microparticles as Internal Additives Papers were prepared by adding calcium, carbonate microparticles of the present invention as an internal filler. A calcium carbonate was mixed with a pulp slurry obtained, by breaking an LBKP (CSF: about 400 mL) in such a ratio that the resulting sheet had an ash content of 20 to 50%, and the mixture was stirred with 100 ppm each of retention aids (ND300 and FA230 both from HYMO CORPORATION) at 500 rpm to prepare a paper stock. Calcium carbonate microparticles of the present invention (Sample 4 in Experiment 1) were tested in comparison with a precipitated calcium carbonate (having an average particle size of about 3.5 µm, Comparative example).

Using the resulting paper stock, laboratory sheets having a basis weight of about 62 g/m$^2$ were prepared according to JIS P 8222, and calendered at 65 kgf/cm in a laboratory chilled calender.

The laboratory sheets thus obtained were evaluated for the following parameters:
Basis weight: JIS P 8124:1998
Thickness: JIS P 8118:1998
Density: calculated from the measured thickness and basis weight
Ash content: JIS P 8251:2003
Brightness: JIS P 8212:1998
Opacity: JIS P 8149:2000
Air resistance: JIS P8117; 2009
Smoothness; JIS P 8155:2010.

Table 8

Experiment 9

| Test No. | | 1 | 2 | 3 | 4 | 5 | 6 |
|---|---|---|---|---|---|---|---|
| Ash content | | 0% | 20% | | 30% | 50% | |
| Filler | | None | 1-4 | Comp | 1-4 | 1-4 | Comp |
| Basis weight | g/m2 | 63.7 | 63.8 | 64.2 | 62.3 | 61.4 | 59.9 |
| Thickness | µm | 114 | 112 | 120 | 106 | 101 | 118 |
| Density | g/cm$^3$ | 0.56 | 0.57 | 0.53 | 0.59 | 0.61 | 0.51 |
| Ash content | % | 0.3 | 19.2 | 20.2 | 29.3 | 48.7 | 47.9 |
| Brightness | % | 85.0 | 87.8 | 88.8 | 88.9 | 90.7 | 91.6 |
| Opacity | % | 76.6 | 83.4 | 86.7 | 85.1 | 87.4 | 90.8 |
| Thickness (after calendering) | µm | 84.5 | 75.8 | 78.0 | 69.3 | 61.5 | 65.0 |
| Density (after calendering) | g/cm$^3$ | 0.76 | 0.84 | 0.83 | 0.90 | 1.00 | 0.92 |
| Brightness (after calendering) | % | 82.2 | 84.7 | 86.4 | 85.2 | 85.7 | 89.0 |
| Opacity (after calendering) | % | 76.6 | 81.2 | 86.1 | 81.6 | 80.7 | 89.8 |
| S value | m2/kg | 39.4 | 57.1 | 71.0 | 65.1 | 78.2 | 108.4 |

-continued

| Test No. | | 1 | 2 | 3 | 4 | 5 | 6 |
|---|---|---|---|---|---|---|---|
| Air resistance | sec | 6 | 10 | 4 | 14 | 30 | 4 |
| Smoothness | sec | 6 | 8 | 8 | 10 | 14 | 9 |
| Ash retention (approximation) | % | — | 85.2 | 47.7 | 83.6 | 74.0 | 64.5 |

As shown, in the table above, papers having high air resistance could be prepared when the calcium carbonate microparticles of the present invention were added into the papers. Further, it was shown that the calcium carbonate of the present invention was very likely to retain in papers as compared with cases where a calcium carbonate having a large average particle size was used.

Experiment 10: Preparation of Products Comprising Calcium Carbonate Microparticles (Coated Papers)

Coated papers were prepared using calcium carbonate microparticles as pigments for the coated papers.
<Pigments (Calcium Carbonates)>
The precipitated calcium carbonate microparticles prepared in Experiment 1-4 (Sample 1-4)
A ground calcium carbonate (having an average primary particle size of 186 nm)
A ground calcium carbonate (having an average primary particle size of 1.2 µm)
<Preparation of Coated Papers>
Coating colors (pigment slurries for coating) were prepared by adding 15 parts of a starch (PG295 from Penford) per 100 parte by weight of each of the calcium carbonates and thoroughly stirring the mixture (consistency: about 24% by weight). The pigment slurries for coating were coated on the following base papers to prepare coated papers. Coating was performed manually using a metal bar having a profiled surface.
A woodfree paper (having a basis weight of 81.4 g/m²)
A coating base paper (having a basis weight of 73.0 g/m²)
A coated paper (A3 coated paper for versatile use having a basis weight of 84.9 g/m²).

Inkjet printing was performed on the coated papers thus prepared using an inkjet printer (a pigment ink-based inkjet printer from EPSON), and evaluated for the following parameters:
Gloss: JIS8142
Smoothness: JIS P 8155:2010
Print density: measured using a densitometer (Spectro Eye LT from X-rite).

TABLE 9

| | | Base paper | | | | | | |
|---|---|---|---|---|---|---|---|---|
| | | Woodfree paper | | | Coating base paper | | | Coated paper | |
| Calcium carbonate | | 1-4 | GCC | Nano GCC | 1-4 | GCC | Nano GCC | 1-4 | Nano GCC |
| Coating mass | g/m2 | 3.4 | 2.0 | 2.3 | 2.5 | 2.8 | 1.3 | 4.0 | 6.6 |
| Sheet gloss | % | 3.7 | 4.3 | 7.3 | 2.8 | 3.4 | 8.2 | 9.7 | 64.9 |
| Sheet smoothness | sec | 90 | 62 | 69 | 43 | 37 | 37 | 800 | 1641 |
| IJ print density (black) | — | 1.2 | 1.3 | 1.2 | 1.3 | 1.2 | 1.3 | 1.4 | 1.7 |
| IJ print gloss | % | 4.3 | 3.2 | 5.2 | 2.7 | 2.8 | 3.4 | 10.6 | 71.2 |

Matt coated papers with low gloss could be prepared by using the calcium carbonate microparticles of the present invention as pigments for coating.

The invention claimed is:

1. A process for preparing calcium carbonate particles having an average primary particle size of less than 1 µm, comprising synthesizing calcium carbonate while injecting under pressure a liquid into a reaction solution in a reaction vessel, wherein the pressure in the vessel is from 0.05 MPa to 0.9 MPa.

2. The process of claim 1, comprising reacting an aqueous suspension of slaked lime and a gas containing carbon dioxide.

3. The process of claim 1, comprising generating cavitation bubbles by injecting a liquid into a reaction vessel and synthesizing calcium carbonate in the presence of the cavitation bubbles.

4. The process of claim 3, wherein the cavitation bubbles are generated by injecting an aqueous suspension of slaked lime into a reaction vessel.

5. The process of claim 2, wherein the reaction solution is circulated from the reaction vessel.

6. The process of claim 1, further comprising modifying the calcium carbonate particles.

7. A calcium carbonate having an average primary particle size of less than 1 µm prepared by the process of claim 1.

8. A product comprising the calcium carbonate particles of claim 7.

9. The product of claim 8, which is a sheet containing the calcium carbonate particles as an internal filler.

10. A coating color comprising the calcium carbonate particles of claim 7.

11. The product of claim 8, which is a kneaded resin obtained by kneading the calcium carbonate particles with a resin.

12. The process of claim 1, wherein the pressure of the injecting liquid is from 2 MPa to 15 MPa.

13. The process of claim 1, wherein the ratio between the pressure in the vessel and the pressure of the injecting liquid is from 0.001 to 0.5.

* * * * *